(12) United States Patent
Ogawa et al.

(10) Patent No.: US 8,958,684 B2
(45) Date of Patent: Feb. 17, 2015

(54) SCREENING MANAGEMENT SYSTEM, SCREENING MANAGEMENT METHOD AND PROGRAM PRODUCT

(75) Inventors: Katsumi Ogawa, Kanagawa (JP); Ryu Sukigara, Kanagawa (JP); Takahisa Ohgami, Kanagawa (JP); Yuta Choki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/591,459

(22) Filed: Aug. 22, 2012

(65) Prior Publication Data

US 2013/0051760 A1 Feb. 28, 2013

(30) Foreign Application Priority Data

Aug. 30, 2011 (JP) ................................. 2011-186755

(51) Int. Cl.
*H04N 5/92* (2006.01)
*H04N 21/482* (2011.01)
*H04N 21/41* (2011.01)
(Continued)

(52) U.S. Cl.
CPC ....... *H04N 21/4825* (2013.01); *H04N 21/4122* (2013.01); *H04N 21/41415* (2013.01); *H04N 21/8549* (2013.01)
USPC ......................................................... 386/241

(58) Field of Classification Search
CPC .......... H04N 21/4122; H04N 21/8549; H04N 21/4825; H04N 21/41415
USPC ....................................................... 386/241
See application file for complete search history.

(56) References Cited

U.S. PATENT DOCUMENTS

| | | | |
|---|---|---|---|
| 6,441,832 B1* | 8/2002 | Tao et al. ....................... | 715/723 |
| 2002/0122052 A1* | 9/2002 | Reich et al. ................... | 345/716 |
| 2002/0122154 A1* | 9/2002 | Morley et al. .................. | 352/38 |

(Continued)

FOREIGN PATENT DOCUMENTS

| EP | 1 708 504 | 10/2006 |
|---|---|---|
| JP | 2011-40885 | 2/2011 |

OTHER PUBLICATIONS

Joseph Morelock: "Using nested playlists to manage school-wide iPod deployments", Apr. 18, 2010, pp. 1-3, XP055153183, Retrieved from the Internet: URL:http://wiki.canby.k12.or.us/groups/ipodusergroup/wiki/18baf/Using_nested_playlists_to_manage_school-wide_iPod_deployments.html [retrieved on Nov. 14, 2014].

(Continued)

*Primary Examiner* — Thai Tran
*Assistant Examiner* — William Tran
(74) *Attorney, Agent, or Firm* — Frommer Lawrence & Haug LLP; William S. Frommer

(57) ABSTRACT

There is provided a screening management system including a content accumulation unit for accumulating a plurality of video contents to be screened, a playlist management unit for managing a playlist defining an order of screening the video contents accumulated in the content accumulation unit and managing a file indicating one or a plurality of video contents to be screened in a specific place in the playlist, and a schedule management unit for managing the playlist according to a screening time. The playlist is a list in which a plurality of frames are arranged, and video content to be screened is indicated by a first frame among the plurality of frames, and the file is indicated by a second frame among the plurality of frames.

5 Claims, 7 Drawing Sheets

(51) Int. Cl.
*H04N 21/414* (2011.01)
*H04N 21/8549* (2011.01)

(56) References Cited

U.S. PATENT DOCUMENTS

| | | | |
|---|---|---|---|
| 2003/0028893 A1* | 2/2003 | H. Addington | 725/115 |
| 2005/0015464 A1 | 1/2005 | Young | |
| 2005/0057724 A1* | 3/2005 | Patton et al. | 352/40 |
| 2007/0282898 A1* | 12/2007 | Stark et al. | 707/103 R |
| 2011/0090397 A1* | 4/2011 | Redmann et al. | 348/468 |
| 2012/0290688 A1* | 11/2012 | Nandakumar et al. | 709/219 |

OTHER PUBLICATIONS

Search Report issued in corresponding European application No. 12 175 516.9 dated Nov. 24, 2014.

* cited by examiner

100 SCREENING MANAGEMENT SYSTEM

FIG. 7
FIRST SCREEN
10:00~12:00
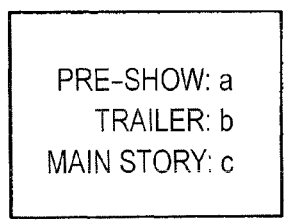
PRE-SHOW: a
TRAILER: b
MAIN STORY: c
↳ PLAYLIST 1
13:00~15:00
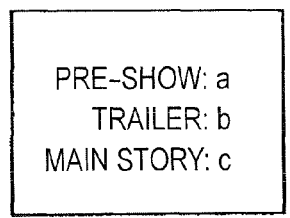
PRE-SHOW: a
TRAILER: b
MAIN STORY: c
↳ PLAYLIST 1
17:00~19:00
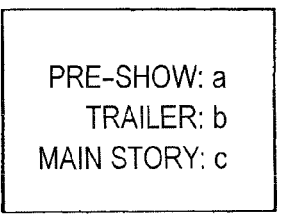
PRE-SHOW: a
TRAILER: b
MAIN STORY: c
↳ PLAYLIST 1
SECOND SCREEN
10:00~12:00
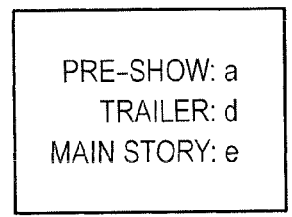
PRE-SHOW: a
TRAILER: d
MAIN STORY: e
↳ PLAYLIST 2
13:00~15:00
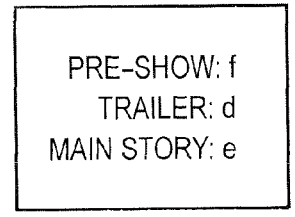
PRE-SHOW: f
TRAILER: d
MAIN STORY: e
↳ PLAYLIST 3
17:00~19:00
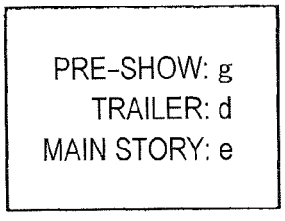
PRE-SHOW: g
TRAILER: d
MAIN STORY: e
↳ PLAYLIST 4
EXAMPLE OF RELATED ART

SCREENING MANAGEMENT SYSTEM, SCREENING MANAGEMENT METHOD AND PROGRAM PRODUCT

BACKGROUND

The present disclosure relates to a screening management system and a screening management method that manage screening of video content in a screening place such as a movie theater, and a program product that executes the screening management method.

In recent years, a system that performs screening by preparing digitalized video content and projecting the video content on a screen using a video projector, instead of screening using movie film of the related art, when the video content such as a movie is screened in a movie theater has become widespread.

In the case of such a screening system, a storage unit called a video content accumulation library is prepared in the movie theater, and content of a movie main story, content of a trailer, content called a pre-show such as an advertisement, and the like are accumulated.

Also, a playlist of video contents is created based on a schedule for screening each piece of content in the movie theater, and screening of the accumulated contents is performed based on the playlist.

FIG. 7 is a diagram showing an example of screening management using a playlist of the related art. In this example, a movie theater having two screens is assumed. On a first screen, pre-show a, trailer b, and main story c are screened from 10:00 to 12:00. Screening of the same combination is performed from 13:00 to 15:00 and from 17:00 to 19:00. In this case, each screening is shown in playlist 1.

Meanwhile, on the second screen, the same trailer d and the same main story e are screened every time, but different pre-shows are screened every time. That is, pre-show a is screened at the time of screening from 10:00, pre-show f is screened at the time of screening from 13:00, and pre-show g is screened at the time of screening from 17:00.

In this case, for screening on the second screen, different playlists 2, 3 and 4 are shown each time screening is performed. The playlist is data indicating contents screened in a certain order.

In Japanese Patent Laid-Open Publication No. 2011-40885, a screening management device that controls screening of video content based on a screening schedule is disclosed.

SUMMARY

However, when screening in a movie theater is managed using playlists, the number of playlists increases according to screening forms and management is complicated. For example, in the example shown in FIG. 7, in the case of the first screen, screening of the same content is repeated every time. Accordingly, one playlist is sufficient. On the other hand, in the case of the second screen, content of the main story or the trailer screened is the same every time, but content of the pre-show such as an advertisement is different every screening time. Accordingly, a different play list is necessary for each screening time.

Further, in the case of a movie as a main story, the same movie is continuously and repeatedly screened every day in a determined period, but the pre-show such as an advertisement is not related to the main story and is likely to be changed into other content. Even when there is replacement of such advertisement, update of the play list is performed.

In FIG. 7, the example in which the movie theater has two screens is shown. In fact, a number of movie theaters having three or more screens continues to increase. There are playlists corresponding to the number obtained by multiplying the number of screens by the number of screening combinations for each screen. Moreover, the playlists are updated each time there is replacement of, for example, advertisements. Accordingly, in a screening management system of the related art, it is necessary to prepare a large number of playlists and movie screening management is complicated.

An object of the present disclosure is to provide a screening management system, a screening management method and a program product capable of partially changing video content with ease.

A screening management system of the present disclosure includes a content accumulation unit for accumulating a plurality of video contents to be screened. Further, the screening management system includes a playlist management unit for managing a playlist defining an order of screening the video contents accumulated in the content accumulation unit and managing a file indicating one or a plurality of video contents to be screened in a specific place in the playlist. Further, the screening management system includes a schedule management unit for managing the playlist according to a screening time. The playlist is a list in which a plurality of frames are arranged, video content to be screened is indicated by a first frame among the plurality of frames, and the file is indicated by a second frame among the plurality of frames.

Further, a screening management method of the present disclosure includes accumulating a plurality of video contents to be screened; acquiring a playlist defining an order of screening the accumulated video contents; and managing the accumulated video contents and a file having one or a plurality of video contents of the video contents. The screening management method includes executing screening of video contents in an order indicated in the playlist according to a screening time.

A list in which a plurality of frames are arranged is created as the playlist of this case, video content to be screened is indicated by a first frame among the plurality of frames, and the file is indicated by a second frame among the plurality of frames.

Furthermore, a program product of the present disclosure includes processes of: accumulating a plurality of video contents to be screened; and acquiring a playlist defining an order of screening the accumulated video contents. The program product includes a process of managing the accumulated video contents and a file having one or a plurality of video contents of the video contents, and executing screening of video contents in an order indicated in the playlist according to a screening time.

A list in which a plurality of frames are arranged is created as the playlist acquired through the process of acquiring the playlist Video content to be screened is indicated by a first frame among the plurality of frames, and the file is indicated by a second frame among the plurality of frames.

Thus, a part of video content to be screened with one playlist can be replaced with other video content by preparing a plurality of files corresponding to the second frame or updating the file.

According to the present disclosure, a part of video content to be screened with one playlist can be replaced with other video content. Thus, it is possible to perform fine screening control such as replacement of partial content according to a screening time or a screening form, without increasing the number of playlists.

For example, replacement of the video of the pre-show can be performed by creating one playlist for screening video content of one main story, preparing a plurality of files corresponding to a pre-show part in the playlist, and changing the file corresponding to the pre-show part for every screening time.

BRIEF DESCRIPTION OF THE DRAWINGS

FIG. 7 is an illustrative diagram showing a screening control example using a playlist of the related art.

DETAILED DESCRIPTION OF THE EMBODIMENT(S)

Figure 1:
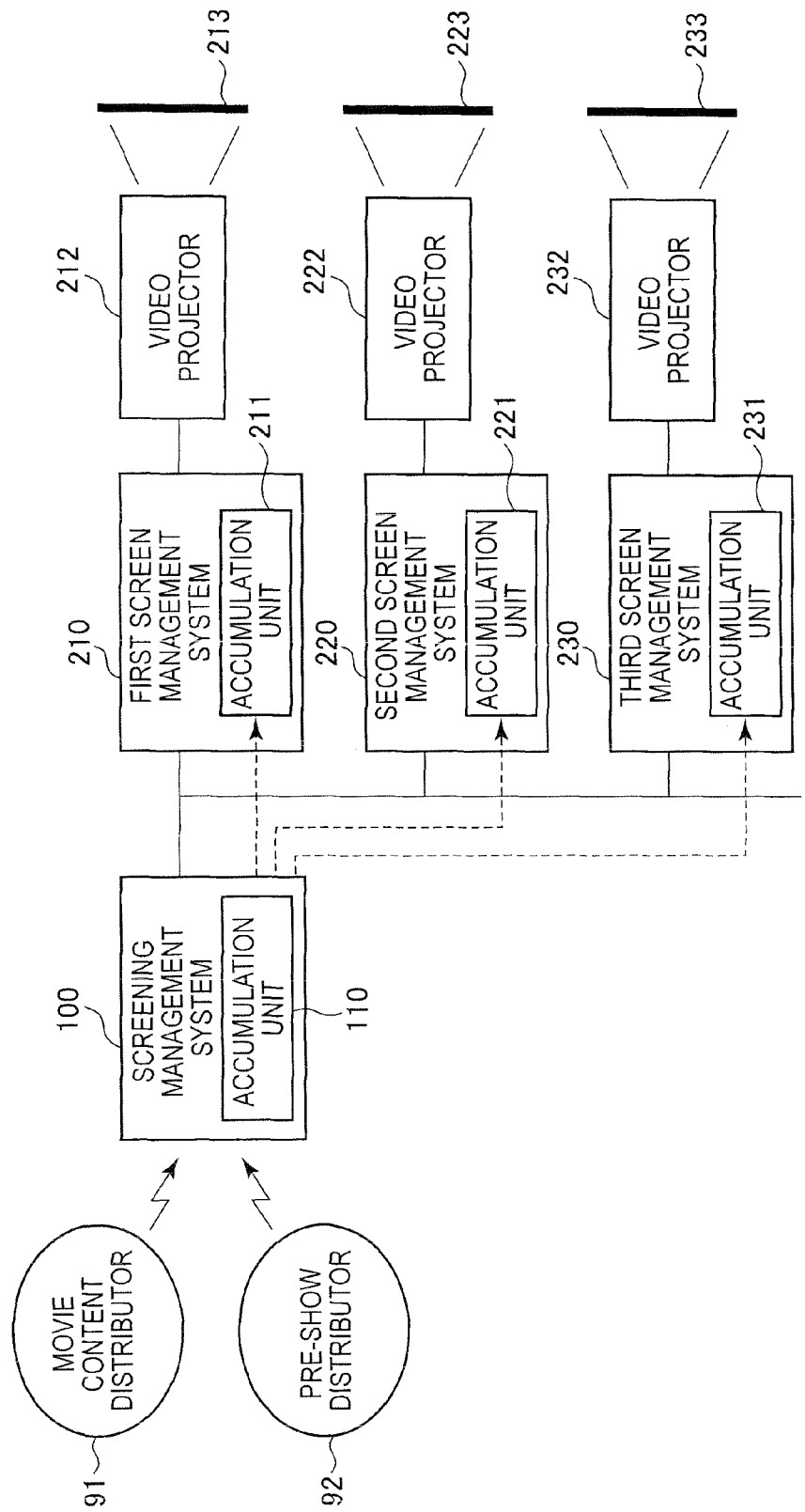
FIG. 1 is a configuration diagram showing an example of an overall system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

An example of an embodiment of the present disclosure will be described in the following order. 1. Configuration Example of Overall System (FIG. 1) 2. Configuration Example of Screening Management System (FIG. 2) 3. Example of Data Managed by Each Management Unit (FIG. 3) 4. Execution Example According to Schedule (FIGS. 4 and 5) 5. Example in Which There Is No Pack Corresponding to Frame (FIG. 6) 6. Variant 1. Configuration Example of Overall System First, a configuration of an overall system that manages screening in a movie theater will be described with reference to FIG. 1.

The movie theater of this example includes three screens 213, 223 and 233, as shown in FIG. 1. Screening of a movie or the like is individually performed on each of the screens 213, 223 and 233 according to a playlist set for each screen.

The movie theater includes a screening management system 100 that is a system for controlling all screening on the three screens, and the screening management system 100 performs screening management. The screening management system 100 includes an accumulation unit 110 for performing large capacity data storage. The accumulation unit 110 stores data of content of a movie supplied from a movie content distributor 91, data of content of a pre-show supplied from a pre-show distributor 92, or the like. Content of a main story of a movie, as well as content of a trailer of the movie, is contained in the data of the content supplied from the movie content distributor 91. The content of the trailer of the movie may be supplied from the pre-show distributor 92.

The accumulation unit 110 includes, for example, a plurality of hard disk drive devices.

Also, the screening management system 100 sends the accumulated data of the content to a screen management system prepared for each screen.

That is, a first screen management system 210 for controlling screening on the first screen 213, a second screen management system 220 for controlling screening on the second screen 223, and a third screen management system 230 for controlling screening on the third screen 233 are included. Also, data of video content to be screened on the first screen 213 is sent to the first screen management system 210 according to a screening schedule of the first screen set in the screening management system 100. In the first screen management system 210, the received data of the video content is accumulated in an accumulation unit 211 in the system. Using the video content accumulated by the accumulation unit 211 of the first screen management system 210, a video projector 212 for the first screen projects the video to the screen 213 and executes screening.

Similarly, data of video content to be screened on the second screen 223 is sent to the second screen management system 220 according to a screening schedule for the second screen set in the screening management system 100. In the second screen management system 220, the received data of the video content is accumulated in an accumulation unit 221 in the system. Using the video content accumulated by the accumulation unit 221, a video projector 222 for the second screen projects the video to the second screen 223 and executes screening.

Further, data of video content to be screened on the third screen 233 is sent to the third screen management system 230 according to a screening schedule for the third screen set in the screening management system 100. In the third screen management system 230, the received data of the video content is accumulated in an accumulation unit 231 in the system. Using the video content accumulated by the accumulation unit 231, a video projector 232 for the third screen projects the video to the third screen 233 and executes screening.

The movie content supplied from the movie content distributor 91 or the pre-show content supplied from the pre-show distributor 92 is supplied as encrypted data to the screening management system 100. This encrypted data is processed in an encrypted state in the screening management system 100 and sent to each of the screen management systems 210, 220 and 230. Also, decoding from encryption is performed in the screen management systems 210, 220 and 230.

2. Configuration Example of Screening Management System

Next, a configuration of the screening management system 100 will be described with reference to FIG. 2.

The screening management system 100 includes a file management unit 101, an authority management unit 102, a schedule management unit 103, a playlist management unit 104, and a content management unit 105. The file management unit 101 receives data such as a screening schedule or a playlist from the outside, and accumulates the received data in the accumulation unit 110. Further, the accumulation unit 110 accumulates video content (movie main story, trailer, and pre-show). Further, the video content may be received via a communication line from, for example, a distributor. Alternatively, for example, a medium such as a hard disk having the content received from the distributor recorded thereon may be mounted on the accumulation unit 110 and the content may be accumulated.

Also, the schedule management unit 103 reads data of the schedule accumulated in the accumulation unit 110. The schedule management unit 103 performs screening management according to the read schedule. In this case, the playlist management unit 104 reads data of a playlist indicated by the schedule from the accumulation unit 110 and sends the data to the schedule management unit 103 so that a playlist executed by the schedule is determined. With execution of the playlist in the schedule management unit 103, the content management unit 105 reads the video content accumulated in the accumulation unit 110 and sends the read video content to the indicated screen management system 210, 220 or 230.

When the management process in the schedule management unit 103, the playlist management unit 104, and the content management unit 105 is performed, the authority management unit 102 determines authority of a manipulating person and the process is performed when corresponding management can be performed with the determined authority. For example, when a person having authority for the screening schedule makes a manipulation, schedule creation or modification in the schedule management unit 103 is permitted by the authority management unit 102. Further, for example, when the authority management unit 102 determines that authority of the manipulating person is authority to perform only update or creation of data on a pre-show (e.g., data of pack that will be described later), the corresponding manipulation is permitted by the authority management unit 102.

3. Example of Data Managed by Each Management Unit

Figure 3:
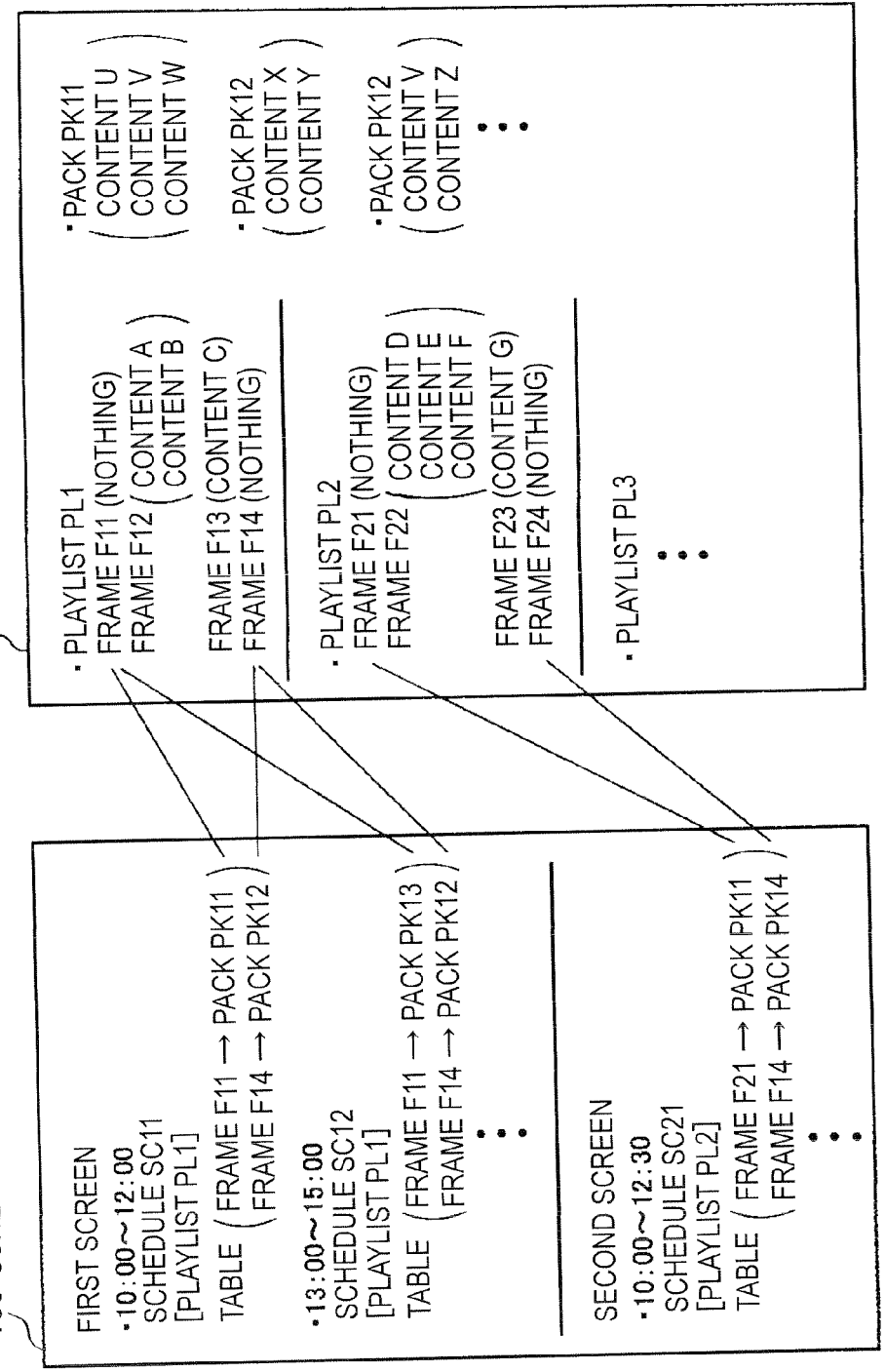
FIG. 3 is a diagram showing an example of data of each management unit according to an embodiment of the present disclosure.

FIG. 3 is an example of data managed by the schedule management unit 103 and the playlist management unit 104.

The schedule management unit 103 has data of a schedule for each screening time of each screen. The data of each schedule contains a playlist number, and data of a frame-pack correspondence table. The frame-pack correspondence table is data indicating a correspondence between a frame in the playlist and a file called a pack.

In the case of the example shown in FIG. 3, for the first screen 213, a movie of a main story is the same between the screening times, and only videos of the pre-shows to be screened before the movie of the main story is screened are different between the respective screening times. When the movie of the main story is the same as described above, the playlist having the same number is designated in the schedule for each screening time. Also, content corresponding to the pre-show is indicated by the data of the frame-pack correspondence table.

Also, for the second screen 223 and the third screen 233, when the movie of the main story is the same for the screens between screening times, the playlist having the same number is designated in each screening time. When the movie of the main story is different, the playlist number is changed. Also, the video of the pre-show is designated by the data of the frame-pack correspondence table.

Specifically, for example, in a schedule SC11 for a screening time from 10:00 to 12:00 of the first screen 213, a playlist PL1 to be executed is indicated by the schedule. Further, the frame-pack correspondence table shows that frame F11 corresponds to pack PK11 and frame F14 corresponds to pack PK12.

Further, in a schedule SC12 for a screening time from 13:00 to 15:00 of the first screen 213, a playlist PL1 to be executed is indicated by the schedule. This playlist PL1 is the same as the playlist for the screening time from 10:00 to 12:00 described above. Further, a frame-pack correspondence table shows that frame F11 corresponds to a pack PK13 and frame F14 corresponds to pack PK12.

Next, the playlist managed by the playlist management unit 104 will be described.

Each playlist is shown as a set of a plurality of frames. For example, playlist PL1 includes four frames F11, F12, F13 and F14. In the first frame F11 among the four frames F11, F12, F13 and F14, video content of a pre-show such as an advertisement video is shown. In the next frame F12, video content of a trailer is shown, and in the next frame F13, video content of a main story is shown. In the last frame F14, video content to be screened after the main story ends is shown. At the time of screening, the screening is performed in order of the video content of frame F11, the video content of frame F12, the video content of frame F13, and the video content of frame F14. Further, a structure using four such frames is one example. For example, frame F14 corresponding to the video content to be screened after the main story ends may be omitted. Further, a first half and a second half of the main story may be indicated as individual video contents by different frames.

As the playlist, data indicating the video contents may be arranged in all the frames as in the above frame structure. However, in the case of the present embodiment, the data indicating the video content is arranged in only some frames (the first frame). Also, data indicating the video content is not arranged in the other frames (the second frame), which become so-called empty frames.

Specifically, for example, in frame F12 indicating the video content of the trailer, and the frame F13 indicating the video content of the main story, each piece of video content is indicated by data in each frame. In playlist PL1 shown in FIG. 3, content A and content B are indicated by frame F12, and content C is indicated by frame F13. contents A and B are the video contents of the trailers and content C is the video content of the main story.

Also, frame F11 indicating the video content of the pre-show and frame F14 indicating video content to be screened after the main story ends are empty frames in which there is no data indicating video content.

The playlist management unit 104 manages the frame-pack correspondence table as well as such playlists.

That is, concrete content of the pack in the frame-pack correspondence table described above is shown. For example, pack PK11 is shown as including video content U, video content V, and video content W. Further, pack PK12 is shown as including video content X and video content Y. Further, pack PK13 is shown as including video content V and video content Z. In this example, a plurality of video contents are arranged in one pack, but only one video content may be arranged in one pack.

Thus, the pack corresponds to a file having a plurality of or one video content. However, the actual video content is not in the pack but is stored in the accumulation unit 110.

Further, content of the frame-pack correspondence table managed by the schedule management unit 103 and the pack managed by the playlist management unit 104 is managed by the authority management unit 102 to be updated or created only when a person having specific authority makes a manipulation. Specifically, for example, manipulation authority is assigned to only the pre-show distributor and not to a worker of the movie theater.

4. Execution Example According to Schedule Example

Figure 4:
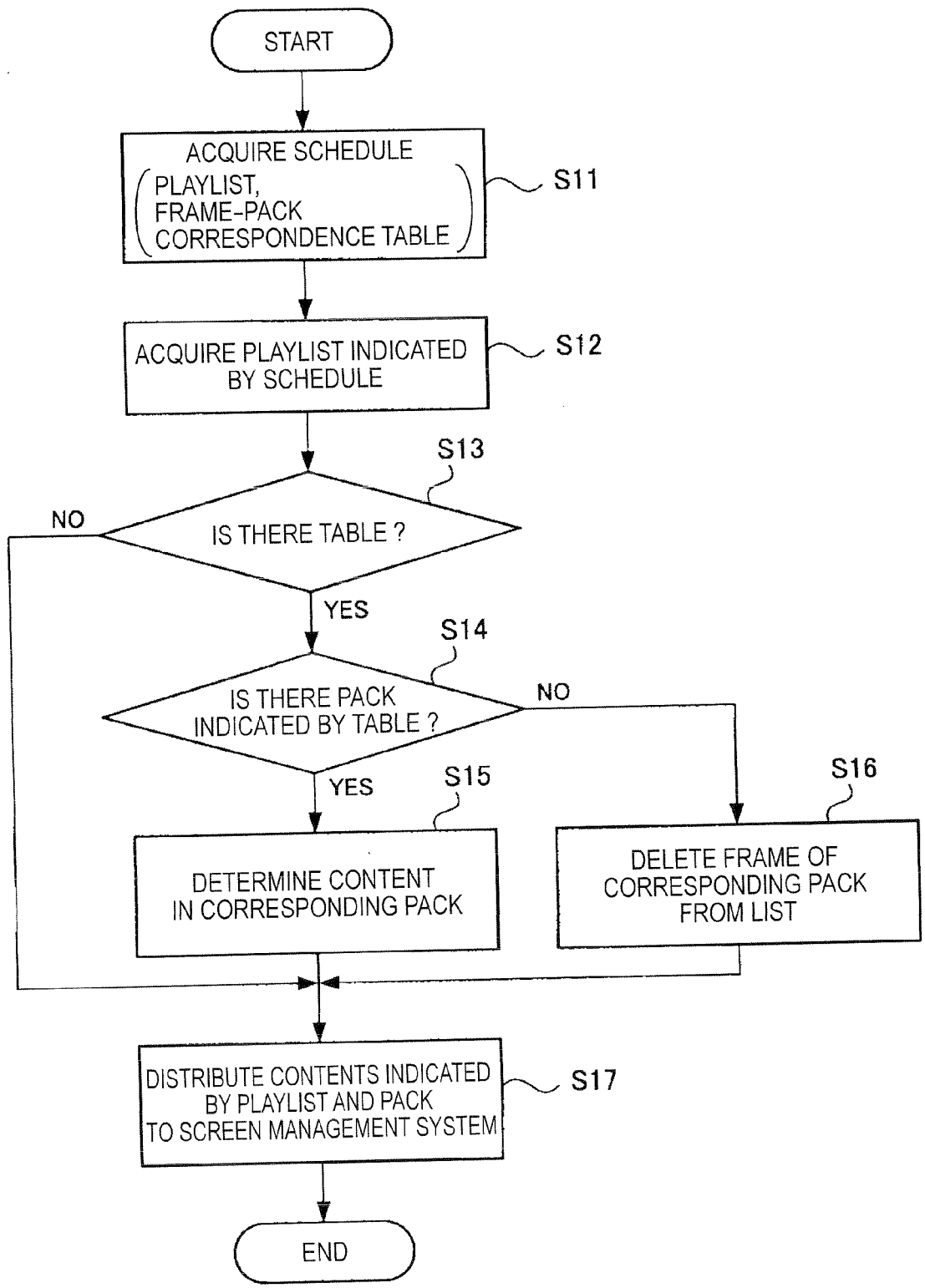
FIG. 4 is a flowchart showing a process example based on a schedule according to an embodiment of the present disclosure.

Next, a process of instructing each screen management system to perform screening based on the data of the schedule in the schedule management unit 103 will be described with reference to a flowchart of FIG. 4.

First, one schedule in the schedule management unit 103 is acquired (step S11). In this case, the playlist number and the frame-pack correspondence table added to the schedule are determined.

Also, the playlist is acquired from the playlist management unit 104 based on the playlist number added to the schedule (step S12). Further, a determination is made as to whether the schedule acquired in step S11 is data to which the frame-pack correspondence table has been added (step S13). If it is determined that the frame-pack correspondence table has been added, a determination is made as to whether there is a pack indicated by the frame-pack correspondence table (step S14).

If it is determined in step S14 that there is a pack indicated by the frame-pack correspondence table, video content in the pack is determined (step S15). Also, video contents indicated by the frames in the playlist and the video contents in the pack are arranged in a frame order, and the video contents are distributed to the screen management system corresponding to the schedule (step S17). Further, in step S16, only a playback order of the video contents may be sent to the screen management system and then the corresponding video content, i.e., the video content indicated by the playback order, may be acquired by the screen management system.

Further, if it is determined in step S13 that the frame-pack correspondence table is not added to the playlist, the process proceeds to step S17. Further, if it is determined in step S14 that there is no pack indicated by the frame-pack correspondence table, the process also proceeds to step S17.

Also, in step S17, only the video contents indicated by the frames in the playlist are arranged in a frame order and the video contents are distributed to the screen management system corresponding to the schedule.

Next, a concrete example of the schedule execution process described in the flowchart of FIG. 4 will be described with reference to FIG. 5.

In this example, schedule SC11 in which screening is performed from 10:00 on the first screen 213 is shown. In this schedule SC11, information in which playlist PL1 is set and a frame-pack correspondence table shows that frame F11 is related to pack PK11 and frame F14 is related to pack PK12 is acquired as information 300.

Also, detailed information 310 of playlist PL1 shown in the information 300 is acquired.

In the detailed information 310 of playlist PL1, playlist PL1 is shown as including frames F11, F12, F13 and F14. In this example, frame F11 is a frame of a part corresponding to a pre-show, frame F12 is a frame of a part corresponding to a trailer, frame F13 is a frame corresponding to a main story, and frame F14 is a frame of a part to be screened after the main story ends.

Video content A and video content B are shown in frame F12 among the frames, and video content C is shown in frame F13. Further, frame F11 and frame F14 are empty frames in which video content is not shown.

In this case, information 311 of pack PK11 corresponding to frame F11 and information 312 of pack PK12 corresponding to frame F14 are acquired based on the frame-pack correspondence table. Also, video content in each pack is video content corresponding to the empty frame.

Specifically, the video content of frame F11 includes video content U, video content V and video content W shown in pack PK11. Further, the video content of frame F14 includes video content X and video content Y shown in pack PK12.

Figure 5:
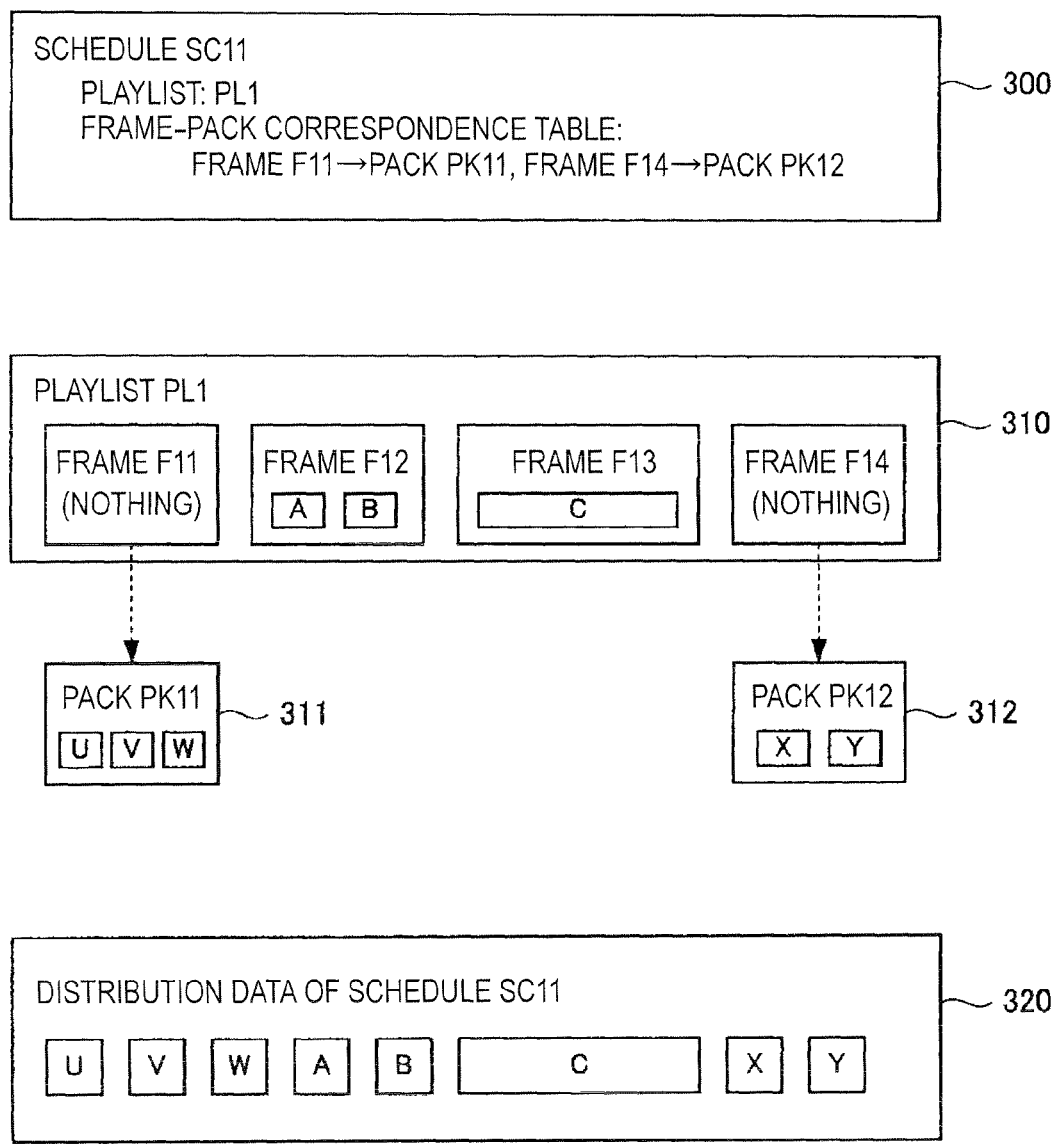
FIG. 5 is a diagram showing an example of video content distribution based on a schedule according to an embodiment of the present disclosure.

Accordingly, video contents to be screened in the schedule SC11 are video contents U, V, W, A, B, C, X and Y arranged in a frame order, as shown in information 320 in FIG. 5. In the arrangement of the video contents U, V, W, A, B, C, X and Y, the video content is distributed from the screening management system 100 to the first screen management system 210. Alternatively, an order of screening the video contents in the information 320 is sent from the screening management system 100 to the first screen management system 210, and the first screen management system 210 acquires the corresponding video contents.

Only the example of one schedule is shown in FIG. 5. However, for example, as the schedule is changed, the frame-pack correspondence table is changed even in the same playlist and the video contents of frame F11 or frame F14 are changed. That is, the video content to be screened in frame F11 corresponding to the pre-show or frame F14 to be screened after the main story ends may be changed into other video content.

5. Example in which there is No Pack Corresponding to Frame

The example of FIG. 5 includes all the packs that are shown in the frame-pack correspondence table. On the other hand, there may be no data of the indicated pack in the determination in step S14 of the flowchart of FIG. 4.

Figure 6:
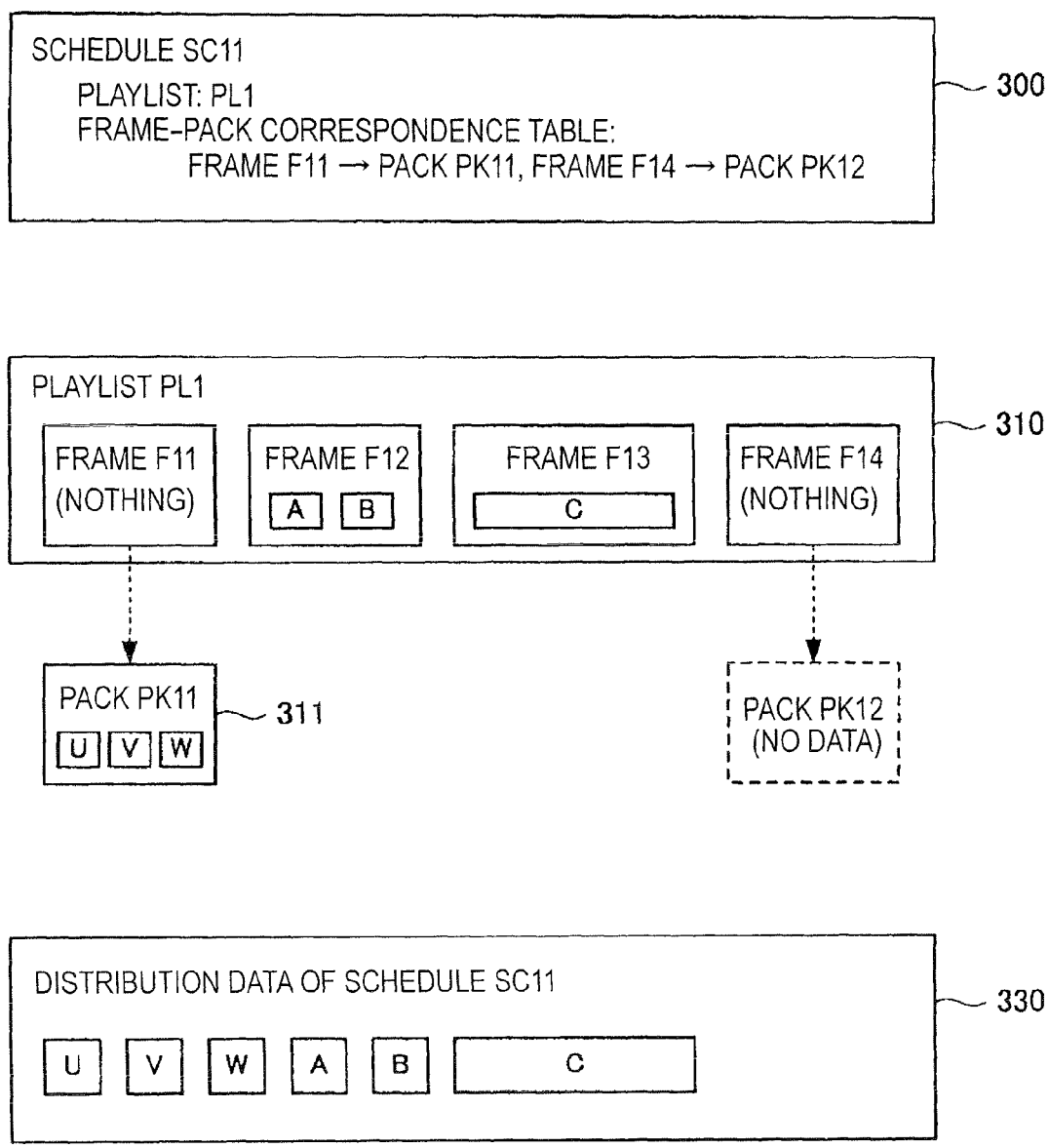
FIG. 6 is a diagram showing an example of video content distribution (when there is no pack corresponding to a frame) based on a schedule according to an embodiment of the present disclosure.

FIG. 6 is a diagram showing a process in this case.

The process is the same as that in FIG. 5 until detailed information 310 of playlist PL1 is acquired based on information 300 of the schedule. Here, in the case of FIG. 6, information of the pack corresponding to frame F14 of playlist PL1 is assumed not to be set in the playlist management unit 104. In this case, in a process of creating the schedule according to playlist PL1, frame F14 is deleted and video contents are arranged using only frames F11, F12 and F13.

Specifically, video contents to be screened according to the schedule SC11 are video contents U, V, W, A, B and C arranged in a frame order, as shown as information 330 in FIG. 6. In the arrangement of the video contents U, V, W, A, B and C, video contents are distributed from the screening management system 100 to the first screen management system 210. Alternatively, an order of screening video contents of the information 330 is sent from the screening management system 100 to the first screen management system 210, and the first screen management system 210 acquires the corresponding video contents.

Further, in the example of FIG. 6, there is no pack. However, for example, even when there is data of the pack, the same process is performed if video content indicated by the pack has been not accumulated.

As the process shown in FIG. 6 is performed, malfunction at the time of screening can be effectively prevented. Specifically, for example, since screening in the pre-show part includes advertisement, many video contents are often screened and it is difficult to check if preparation of video contents has been completed. Accordingly, some video contents are likely not to be screened due to deficiency of contents of the pack or non-accumulation of video contents. However, even if such a situation occurs, an accident of a video going partially undisplayed does not occur and the screening according to the schedule does not fail since a corresponding part is automatically skipped to perform screening.

As described above, as the present embodiment is applied, video content to be screened in a partial section in the playlist can be indicated by the file called a pack different from the playlist. Thus, as basic screening forms such as a main story or a trailer at the time of movie screening are indicated by the playlist and the pre-show part that is likely to be changed each time screening is performed is indicated by the pack, it is possible to cope with a variety of screening forms without increasing the number of playlists.

A manipulation to change or update the information of the pack is performed by the authority management unit 102 such that the manipulation by the worker of the movie theater is limited and only a person having particular authority to manipulate the part, such as the pre-show distributor, is allowed to do so. Accordingly, reliable and appropriate pre-show screening can be realized. That is, the movie theater that performs a screening manipulation is not related to a manipulation such as video selection at the time of screening the pre-show, such as an advertisement, and the screening is reliably performed as determined by the pre-show distributor. Thus, it is possible to prevent trouble such as a specific advertisement video being not screened due to, for example, a wrong manipulation on the part of the movie theater.

Further, as the pre-show part is indicated by the pack, it is possible to update, for example, advertisements screened as pre-shows into other videos, without changing the play list, only by the pre-show distributor updating content of the pack. Thus, it is possible to simply update the advertisements screened as pre-shows into other videos.

6. Variant

Further, in the example of the embodiment described above, the frame of the pre-show part and the frame of the part to be screened after the main story is screened among the frames shown in the playlist are shown as empty frames in the content of the packs. An application to the two frames is only one example. The above may be applied to other frames. Further, while the data for specifying the video content has been arranged as content of the pack, a pack (file) in which the video content is arranged may be prepared.

Further, while the authority management unit 102 limits the update or creation of the pack corresponding to the pre-show part to a specific manipulating person, the limit based on the authority is one example and the movie theater may also make a manipulation.

Further, in the example of the embodiment described above, the screening management system is connected to the screen management systems and the screening is performed using the screen management systems. In the case of a movie theater (a screening theater) where there are a plurality of screens, such a system is adopted. However, in the case of a movie theater including only one screen, a video is directly screened using a projector based on the schedule obtained by the screening management system.

Figure 2:
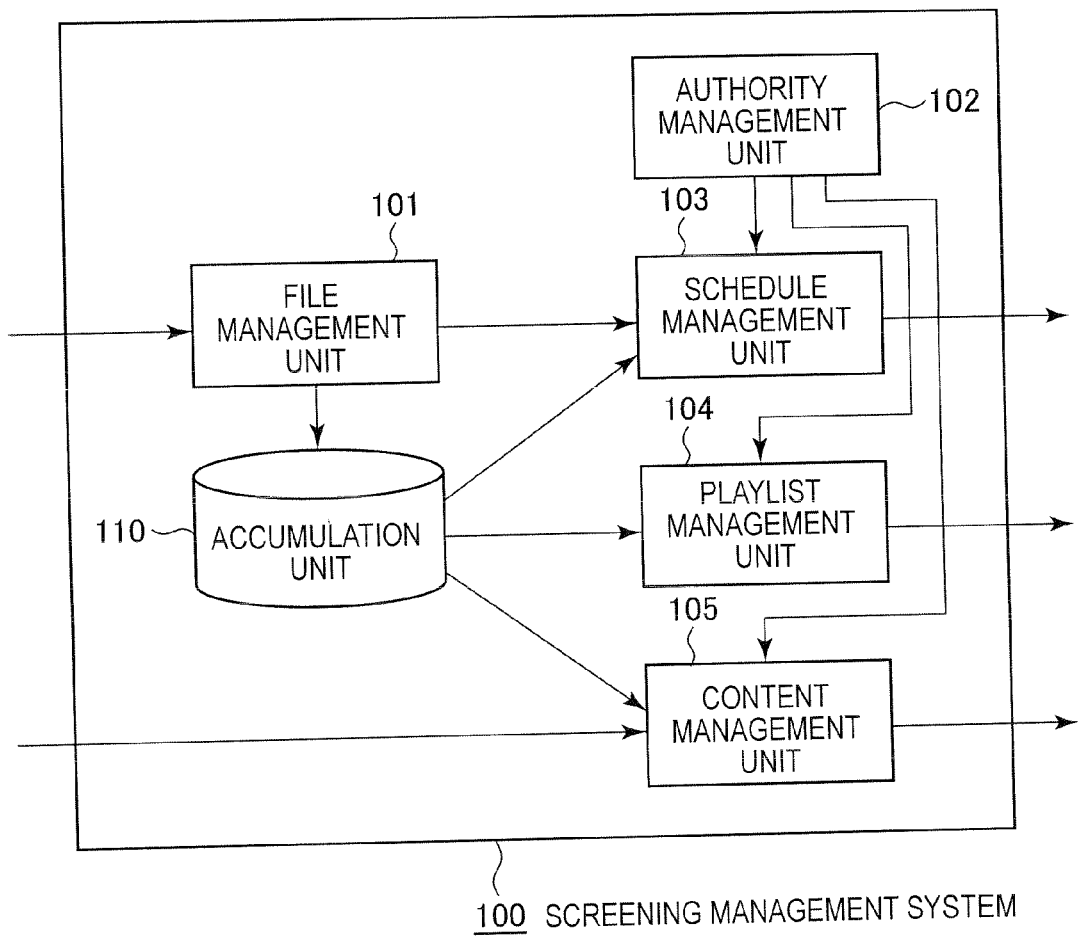
FIG. 2 is a configuration diagram showing an example of a screening management system according to an embodiment of the present disclosure.

Further, in the example of the embodiment described above, as a component of the screening management system shown in FIG. 2, the playlist management unit 104 is provided and the playlist management unit 104 performs the playlist management and the management of the file called a pack. On the other hand, the management of the file called a pack may be performed by another management unit. For the processing units that perform the other data management, the configuration of FIG. 2 is one example and the other processing units may execute, for example, the management.

Further, the example in which the screening management system is configured as a dedicated device has been shown in the example of the embodiment described above. On the other hand, the screening management system described in the embodiment may be configured, for example, by producing a program for executing the process shown in the flowchart of FIG. 4 and installing the program in a general-purpose computer device.

Additionally, the present technology may also be configured as below.

(1) A screening management system including:
a content accumulation unit for accumulating a plurality of video contents to be screened;
a playlist management unit for managing a playlist defining an order of screening the video contents accumulated in the content accumulation unit and managing a file indicating one or a plurality of video contents to be screened in a specific place in the playlist; and
a schedule management unit for managing the playlist according to a screening time,
wherein the playlist is a list in which a plurality of frames are arranged, and
video content to be screened is indicated by a first frame among the plurality of frames, and the file is indicated by a second frame among the plurality of frames.

(2) The screening management system according to (1), wherein:
a frame-file correspondence table indicating a correspondence between the second frame and the file is added to the playlist for each screening time, and
video content to be screened in the corresponding frame is changeable for each screening time by changing a file shown in the frame and file association table.

(3) The screening management system according to (2), wherein:
when there is no file or video content shown in the frame and file association table, a screening schedule is created with a corresponding part of the frame or the video content excluded.

(4) The screening management system according to any one of (1) to (3), wherein:
video content to be screened in a period of the second frame is updatable into other video content without changing the playlist by updating the file.

(5) The screening management system according to any one of (1) to (4), wherein:
video content indicated by the first frame among the plurality of frames indicated by the playlist and video content in a file indicated by the second frame are read from the content accumulation unit and sent to a screen management system prepared for each screen.

(6) The screening management system according to any one of (1) to (5), including:
an authority management unit,
wherein only a person whose authority is recognized by the authority management unit performs update or creation of the file.

(7) A screening management method including:
accumulating a plurality of video contents to be screened;
acquiring a playlist defining an order of screening the accumulated video contents;
managing the accumulated video contents and a file having one or a plurality of the video contents, and executing screening of video contents in an order indicated by the playlist according to a screening time;

creating a list in which a plurality of frames are arranged, as the playlist; and indicating video content to be screened using a first frame among the plurality of frames, and indicating the file using a second frame among the plurality of frames.

(8) A program product for causing a computer to execute screening of video contents by causing the computer to execute processes of:

accumulating a plurality of video contents to be screened;

acquiring a playlist defining an order of screening the accumulated video contents; and managing the accumulated video contents and a file having one or a plurality of the video contents, and executing screening of video contents in an order indicated by the playlist according to a screening time;

wherein a list in which a plurality of frames are arranged is created as the playlist acquired through the process of acquiring the playlist; and video content to be screened is indicated by a first frame among the plurality of frames, and the file is indicated by a second frame among the plurality of frames.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2011-186755 filed in the Japan Patent Office on Aug. 30, 2011, the entire content of which is hereby incorporated by reference.

What is claimed is:

1. A screening management system comprising:
a content accumulation unit for accumulating a plurality of video contents to be screened;
a playlist management unit for managing a playlist defining an order of screening the video contents accumulated in the content accumulation unit and managing the video contents to be screened in a specific place at a pre-set screening time in the order defined by the playlist; and
a schedule management unit for managing the playlist according to the screening time at which contents of the playlist are to be screened,
wherein the playlist is a list of a plurality of frames,
wherein at least some of the frames include packs, each pack identifying one or more video contents stored in the content accumulation unit, and at least some of the frames identify particular video content for screening,
wherein the playlist includes a frame-pack correspondence table for each screening time, the frame-pack correspondence table indicating a correspondence between a respective frame and the pack included in said respective frame,
wherein the video content to be screened, as identified by the pack corresponding to said respective frame, is changeable for each screening time by changing the pack in the frame-pack correspondence table having correspondence with said respective frame, thereby changing the content identified by that pack,
wherein at least some of the video content is stored in the content accumulation unit,
wherein the frames are arranged in the order in which the particular video content identified by said packs are screened in the specific place,
wherein the video content identified by a pack is read from the content accumulation unit at the screening time at which said video content is to be screened; and
wherein when there is no pack or video content in the frame-pack correspondence table having correspondence with a frame, a screening schedule is created with a corresponding part of the frame or the video content excluded.

2. The screening management system according to claim 1, wherein:
video content read from the content accumulation unit is sent to a screen management system prepared for each screen.

3. The screening management system according to claim 1, comprising:
an authority management unit,
wherein only a person whose authority is recognized by the authority management unit is permitted to update or create the file.

4. A screening management method comprising:
accumulating a plurality of video contents to be screened;
acquiring a playlist defining an order of screening the accumulated video contents;
managing the accumulated video contents, and executing screening of video contents in an order defined by the playlist according to a pre-set screening time;
creating a playlist of a plurality of frames,
wherein at least some of the frames include packs, each pack identifying one or more of the accumulated video contents stored in the content accumulation unit, and at least some of the frames identify particular video content for screening,
wherein the frames are arranged in the order in which the particular video content identified by said files are screened in a specific place,
wherein the playlist includes a frame-pack correspondence table for each screening time, the frame-pack correspondence table indicating a correspondence between a respective frame and the pack included in said respective frame,
wherein the video content to be screened, as identified by the pack corresponding to said respective frame, is changeable for each screening time by changing the pack in the frame-pack correspondence table having correspondence with said respective frame, thereby changing the content identified by that pack,
reading from the accumulated content the video content identified by a pack at the screening time at which said video content is to be screened; and
wherein when there is no pack or video content in the frame-pack correspondence table having correspondence with a frame, a screening schedule is created with a corresponding part of the frame or the video content excluded.

5. A non-transitory computer-readable medium on which is recorded a program for causing a computer to execute screening of video contents by causing the computer to execute processes of:
accumulating a plurality of video contents to be screened;
acquiring a playlist defining an order of screening the accumulated video contents;
managing the accumulated video contents, and executing screening of video contents in an order defined by the playlist according to a pre-set screening time;
wherein the playlist is a list of a plurality of frames;
wherein at least some of the frames include packs, each pack identifying one or more of the accumulated video contents stored in the content accumulation unit, and at least some of the frames identify particular video content for screening, wherein the frames are arranged in the order in which the particular video content identified by said files are screened in the specific place, wherein the playlist includes a frame-pack correspondence table for each screening time, the frame-pack correspondence table indicating a correspondence between a respective frame and the pack included in said respective frame, wherein the video content to be screened, as identified by the pack corresponding to said respective frame, is changeable for each screening time by changing the pack in the frame-pack correspondence table having correspondence with said respective frame, thereby changing the content identified by that pack, reading from the accumulated content the video content identified by a pack at the screening time at which said video content is to be screened; and wherein when there is no pack or video content in the frame-pack correspondence table having correspondence with a frame, a screening schedule is created with a corresponding part of the frame or the video content excluded.

\* \* \* \* \*